(12) United States Patent
Caskey et al.

(10) Patent No.: US 8,686,683 B2
(45) Date of Patent: Apr. 1, 2014

(54) CHARGE CLIP

(75) Inventors: Henry Dale Caskey, Cicero, IN (US); David Anthony Benedetti, Carmel, IN (US)

(73) Assignee: Audiovox Corporation, Hauppauge, NY (US)

( * ) Notice: Subject to any disclaimer, the term of this patent is extended or adjusted under 35 U.S.C. 154(b) by 209 days.

(21) Appl. No.: 13/065,370

(22) Filed: Mar. 21, 2011

(65) Prior Publication Data

US 2011/0227535 A1     Sep. 22, 2011

Related U.S. Application Data

(60) Provisional application No. 61/340,756, filed on Mar. 22, 2010.

(51) Int. Cl.
*H02J 7/00* (2006.01)

(52) U.S. Cl.
USPC ........... 320/107; 320/111; 320/112; 320/114; 439/171; 439/172; 439/173

(58) Field of Classification Search
USPC ........... 320/107, 111, 112–114; 439/171–173
See application file for complete search history.

(56) References Cited

U.S. PATENT DOCUMENTS

| | | | |
|---|---|---|---|
| 2,636,096 A | 4/1953 | Di Blasi | 337/189 |
| D195,463 S | 6/1963 | Tamarin | D13/137.4 |
| 4,960,384 A | 10/1990 | Singer et al. | 439/155 |
| D312,615 S | 12/1990 | Schwartz | D13/137.2 |
| D316,484 S | 4/1991 | Kounis et al. | D3/221 |
| 5,313,152 A | 5/1994 | Wozniak et al. | 320/6 |
| D348,775 S | 7/1994 | Scheid | D3/218 |
| 5,327,065 A | 7/1994 | Bruni et al. | 320/108 |
| D350,938 S | 9/1994 | Rossman et al. | D13/137.2 |
| D357,460 S | 4/1995 | Lovett | D13/139.1 |
| D361,315 S | 8/1995 | Wedell et al. | D13/160 |
| D379,160 S | 5/1997 | Johansson et al. | D11/216 |
| D401,219 S | 11/1998 | Stekelenburg | D13/137.2 |
| D408,355 S | 4/1999 | Welsh et al. | D13/139.4 |
| 5,955,791 A | 9/1999 | Irlander | 307/38 |
| D415,067 S | 10/1999 | Tung | D11/200 |
| D428,327 S | 7/2000 | Stekelenburg | D8/359 |
| D432,499 S | 10/2000 | Stekelenburg | D13/139.6 |
| D434,344 S | 11/2000 | Nezu | D11/216 |
| D440,203 S | 4/2001 | Ewing et al. | D13/137.2 |
| D442,550 S | 5/2001 | Tong et al. | D13/137.2 |
| D447,087 S | 8/2001 | Hodge | D11/200 |
| D461,746 S | 8/2002 | Olson et al. | D11/201 |
| D468,848 S | 1/2003 | Schenck | D26/26 |

(Continued)

*Primary Examiner* — Samuel Berhanu
(74) *Attorney, Agent, or Firm* — Gerald T. Bodner

(57) ABSTRACT

A charge clip having a main body and plug received through an aperture therein includes a cradle for holding a personal electronic instrument (PEI) thereon. The plug is inserted into a wall outlet and the main body is selectively rotationally moveable with respect to the plug so that the main body is maintained in a vertical orientation regardless of the orientation of the wall outlet. The plug includes at least one rib that is selectively engageable with at least one notch formed in the aperture, preventing rotational movement of the main body with respect to the plug. The plug further includes an AC/DC conversion circuit that converts standard AC power from the wall outlet to DC power for charging the PEI. The charge clip further includes at least one USB port in electrical communication with the AC/DC conversion circuit that receives a USB plug in electrical communication with the PEI.

8 Claims, 10 Drawing Sheets

(56) References Cited

U.S. PATENT DOCUMENTS

| | | | |
|---|---|---|---|
| D469,062 S | 1/2003 | Nieto et al. | D13/137.2 |
| 6,510,067 B1 | 1/2003 | Toebes | 363/146 |
| D477,792 S | 7/2003 | Kaneko et al. | D11/200 |
| 6,614,206 B1 | 9/2003 | Wong et al. | 320/136 |
| D481,357 S | 10/2003 | Stekelenburg | D13/139.8 |
| D483,724 S | 12/2003 | Wu | D13/139.7 |
| D486,126 S | 2/2004 | Aromin | D13/137.2 |
| D495,657 S | 9/2004 | Lee | D13/137.2 |
| 6,821,134 B2 * | 11/2004 | Chen | 439/131 |
| D514,067 S | 1/2006 | Lee | D13/137.2 |
| 7,050,285 B2 | 5/2006 | Sato et al. | 361/119 |
| 7,140,922 B2 | 11/2006 | Luu et al. | 439/651 |
| D567,708 S | 4/2008 | Jallen | D11/200 |
| D568,785 S | 5/2008 | Yang et al. | D11/218 |
| D582,346 S | 12/2008 | Zhou | D13/137.2 |
| D586,691 S | 2/2009 | Snell | D11/214 |
| D588,065 S | 3/2009 | Wadsworth et al. | D13/137.2 |
| 7,520,783 B2 | 4/2009 | Chou et al. | 439/652 |
| D606,545 S | 12/2009 | Salmon | D14/434 |
| D616,817 S | 6/2010 | Walker et al. | D13/119 |
| D618,175 S | 6/2010 | Shi | D13/137.2 |
| D619,535 S | 7/2010 | Shi | D13/137.2 |
| 7,824,051 B2 | 11/2010 | Walter et al. | 362/101 |
| 7,997,925 B2 | 8/2011 | Lam et al. | 439/535 |
| 8,072,183 B2 | 12/2011 | Griffin, Jr. | 320/107 |
| 2004/0121648 A1 | 6/2004 | Voros | 439/535 |
| 2005/0041827 A1 * | 2/2005 | Wu | 381/323 |
| 2007/0108938 A1 | 5/2007 | Veselic | 320/111 |
| 2007/0273325 A1 | 11/2007 | Krieger et al. | 320/106 |
| 2007/0285053 A1 | 12/2007 | Noguchi et al. | 320/114 |
| 2008/0012536 A1 | 1/2008 | Glass | 320/165 |
| 2008/0111522 A1 | 5/2008 | Simpson et al. | 320/162 |
| 2008/0140887 A1 | 6/2008 | Gallant et al. | 710/110 |
| 2008/0150480 A1 * | 6/2008 | Navid | 320/113 |
| 2008/0157715 A1 | 7/2008 | Rosenboom et al. | 320/108 |
| 2008/0164845 A1 | 7/2008 | Choi | 320/115 |
| 2008/0174265 A1 * | 7/2008 | Toya | 320/107 |
| 2008/0183909 A1 | 7/2008 | Lim et al. | 710/14 |
| 2008/0231233 A1 | 9/2008 | Thornton | 320/137 |
| 2009/0015198 A1 * | 1/2009 | Brandenburg | 320/115 |
| 2009/0284219 A1 | 11/2009 | Meek | 320/107 |
| 2010/0219790 A1 | 9/2010 | Chadbourne et al. | 320/107 |
| 2011/0016334 A1 | 1/2011 | Tom et al. | 713/300 |
| 2011/0029703 A1 | 2/2011 | Huo et al. | 710/110 |
| 2011/0050164 A1 | 3/2011 | Partovi et al. | 320/108 |
| 2011/0084660 A1 | 4/2011 | McSweyn | 320/111 |
| 2011/0276734 A1 | 11/2011 | Helfrich | 710/105 |
| 2012/0258632 A1 | 10/2012 | Lee et al. | 439/660 |

* cited by examiner

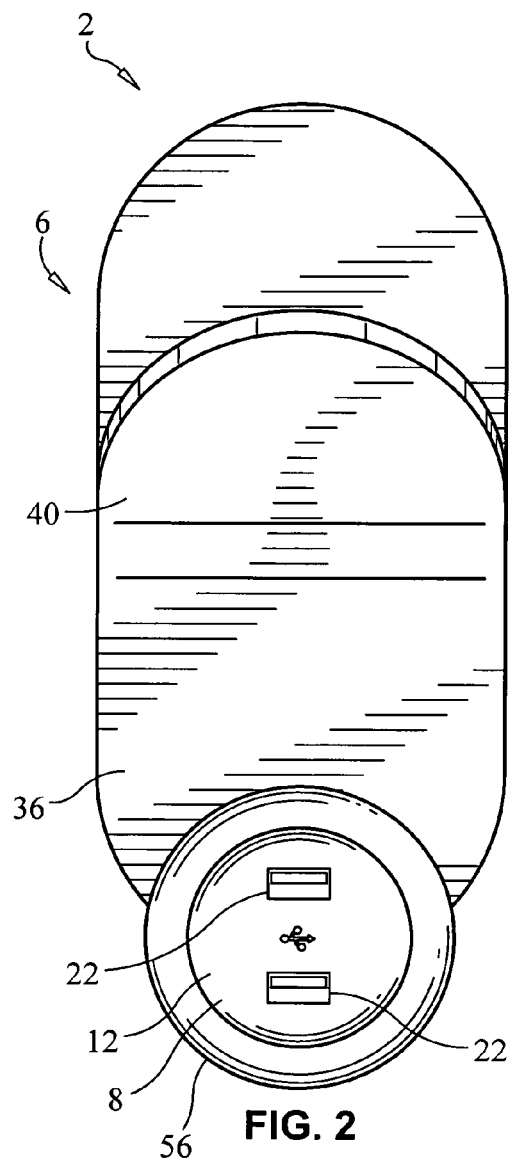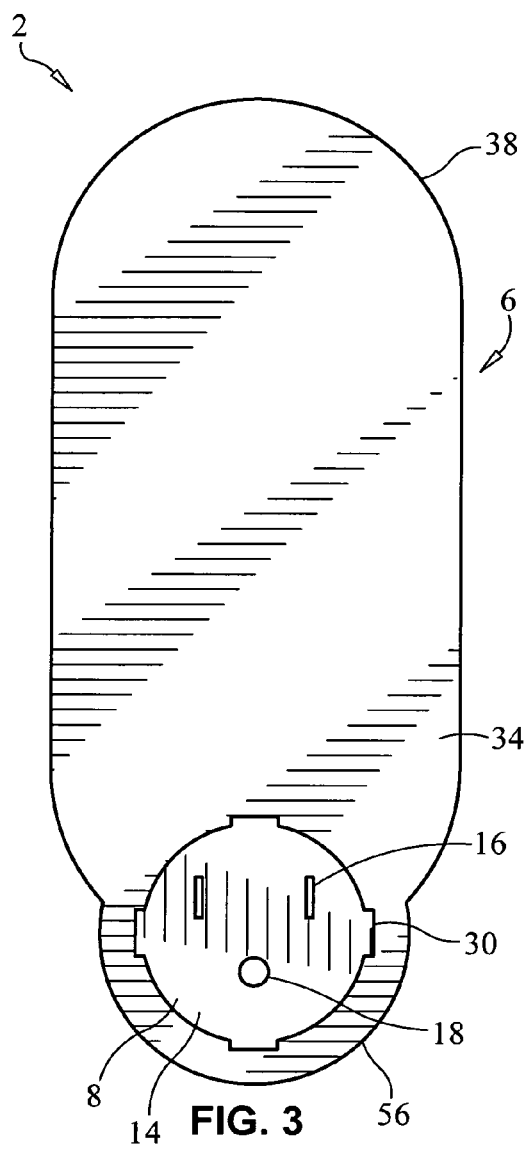

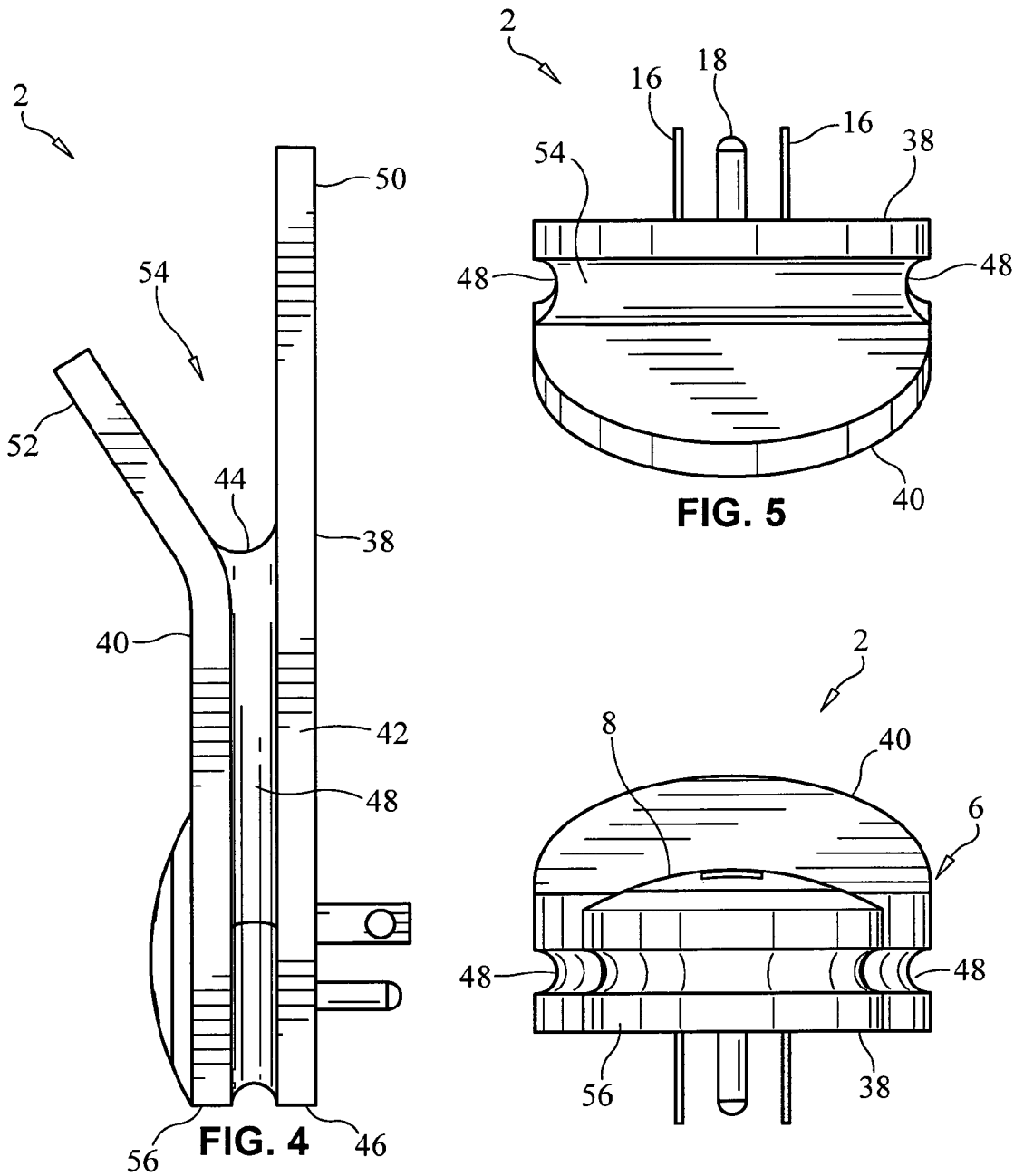

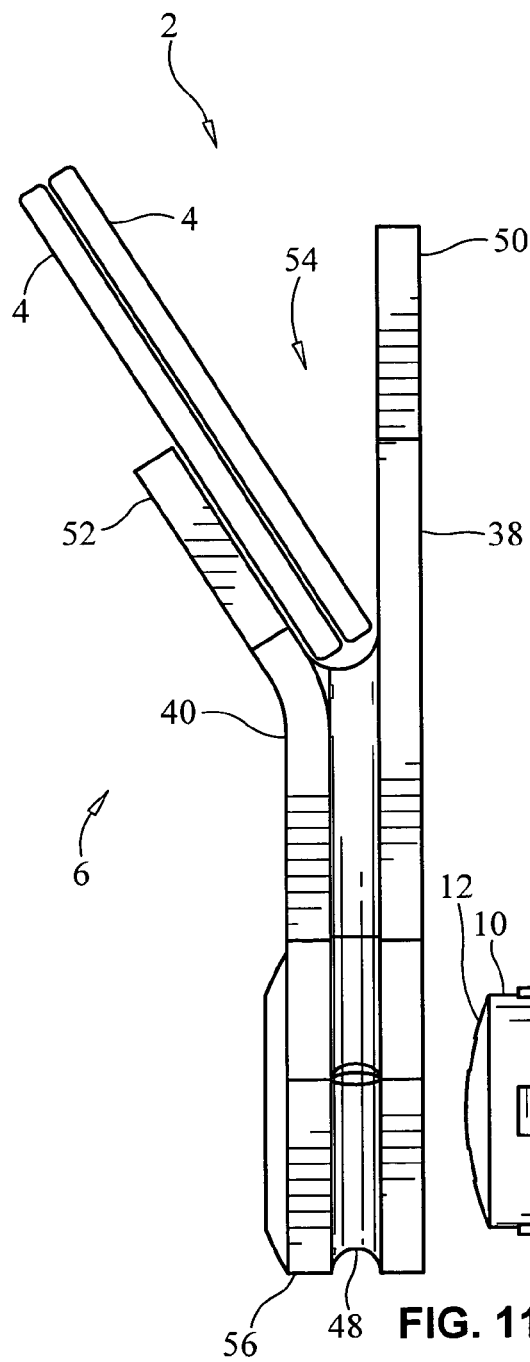
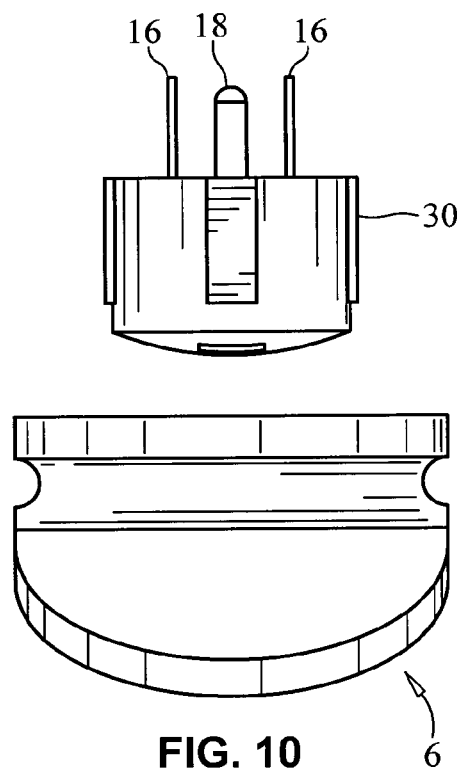
FIG. 10
FIG. 11

CHARGE CLIP

CROSS-REFERENCE TO RELATED APPLICATIONS

This application is related to U.S. Provisional Application Ser. No. 61/340,756, which was filed on Mar. 22, 2010, and is entitled "Charge Clip", the disclosure of which is hereby incorporated by reference and on which priority is hereby claimed.

BACKGROUND OF THE INVENTION

1. Field of the Invention

The present invention relates to devices for charging electrical equipment, in particular, personal electronic instruments such as cellular telephones, calculators, hand held gaming devices, digital cameras and the like.

2. Description of the Prior Art

Devices for charging portable electrical equipment, in particular, personal electronic instruments such as cellular telephones, hand held gaming devices, digital cameras, PDAs, calculators and the like usually plug into a wall outlet (120 volts AC) and include an AC to DC converter, which is coupled to a rather lengthy wire at one end whose opposite end is coupled to a connector which plugs into the electrical equipment to be charged. Many consumers charge these small appliances or electrical devices in their kitchen (which is becoming the most often used room in the home), plugging the charging unit into a wall outlet and placing the electrical device on a kitchen countertop as the device is being charged. The problem with this conventional method of charging a device is that the device being charged occupies the limited counter space in the kitchen and could be subject to damage due to spilled water or the like. Furthermore, the charging electrical cord, usually about three feet in length, loosely lies on the countertop in an unsightly manner and may become entangled with objects residing on the countertop.

A wall mounted charging station for charging a personal electronic instrument (PEI) is disclosed in U.S. Patent Application Publication No. 2008/0012536 (Glass). However, there are a number of disadvantages and shortcomings in the use and design of such a wall mounted charging station. One shortcoming with such a design is that the charging station disclosed in the aforementioned published application still requires a wire connection, such as with cord 17, between the charging station 10 and the AC wall outlet 14. This wire connection may be lengthy, depending upon where the charging station 10 is positioned with respect to the wall outlet 14, and having such an unsupported loose wire may not be aesthetically pleasing in appearance.

Another shortcoming of the charging station disclosed in the aforementioned published application is that the PEI rests in a pocket 46 having defined and confining dimensions and, as a result, may receive only certain select PEIs of limited sizes and shapes.

OBJECTS AND SUMMARY OF THE INVENTION

It is an object of the present invention to provide a charge clip for charging a personal electronic instrument (PEI) which is mountable directly to an AC wall outlet.

It is another object of the present invention to provide a charge clip for charging a PEI which includes an open cradle for supporting a wide variety of PEIs of different sizes and shapes.

It is still another object of the present invention to provide a charge clip for charging a PEI which can support and charge simultaneously more than one PEI.

It is a further object of the present invention to provide a charge clip for charging a PEI which includes an open cradle for supporting one or more PEIs and which cradle provides multi-directional accessibility to the PEIs supported by the cradle.

It is yet a further object of the present invention to provide a charge clip for charging a PEI which is reconfigurable by the user so that it may be mounted directly to an AC wall outlet irrespective of the orientation of the wall outlet.

It is still a further object of the present invention to provide a charge clip for charging one or more PEIs which occupies only one socket of a multiple socket wall outlet and which does not obscure or interfere with the use of the other sockets.

It is another object of the present invention to provide a charge clip for charging a PEI or other electrical device which overcomes the inherent disadvantages of known charging stations.

In accordance with one form of the present invention, a charge clip includes a main body having a cradle for holding at least one PEI and a power conversion plug. The power conversion plug, having a plurality of prongs exiting a rear wall thereof, is inserted into a wall outlet. The power conversion plug is received within an aperture in the main body of the charge clip and is selectively rotatable therein.

The power conversion plug further includes at least one outwardly extending rib that may be selectively engaged with a corresponding notch in the aperture of the main body. The power conversion plug is inserted into the wall outlet and the main body is rotated so that the cradle is vertically oriented to hold at least one PEI. The rib of the power conversion plug is then engaged with the notch in the main body making the main body and cradle thereon rotationally immovable with respect to the power conversion plug. In a preferred embodiment of the present invention, the charge clip includes a plurality of ribs and notches so that the power plug may be inserted into wall outlets of varying orientations while maintaining the vertical orientation of the cradle and PEI therein.

The power conversion plug further includes a conversion circuit and at least one USB port. The conversion circuit, being in electrical communication with both the USB port and prongs, receives AC power from the wall outlet and converts it to DC power, outputting the DC power to the USB port in electrical communication thereto. The PEI is connected by a conventional USB cable to the USB port of the charge clip.

The main body of the charge clip further includes a channel formed between the front and back plates that may be used to store any excess length of the USB cable attached to the PEI.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 2 is a front elevational view of the charge clip of the present invention shown in FIG. 1.

FIG. 3 is a rear elevational view of the charge clip of the present invention shown in FIGS. 1 and 2.

FIG. 4 is a right elevational view of the charge clip of the present invention shown in FIGS. 1-3, a left elevational view thereof being a mirror image of the right elevational view shown in FIG. 4.

FIG. 5 is a top plan view of the charge clip of the present invention shown in FIGS. 1-4.

FIG. 6 is a bottom plan view of the charge clip of the present invention shown in FIGS. 1-5.

FIG. 10 is a top plan exploded view of the charge clip of the present invention shown in FIGS. 1-9.

FIG. 11 is a right elevational exploded view of the charge clip of the present invention shown in FIGS. 1-10.

DETAILED DESCRIPTION OF THE PREFERRED EMBODIMENTS

Figure 1:
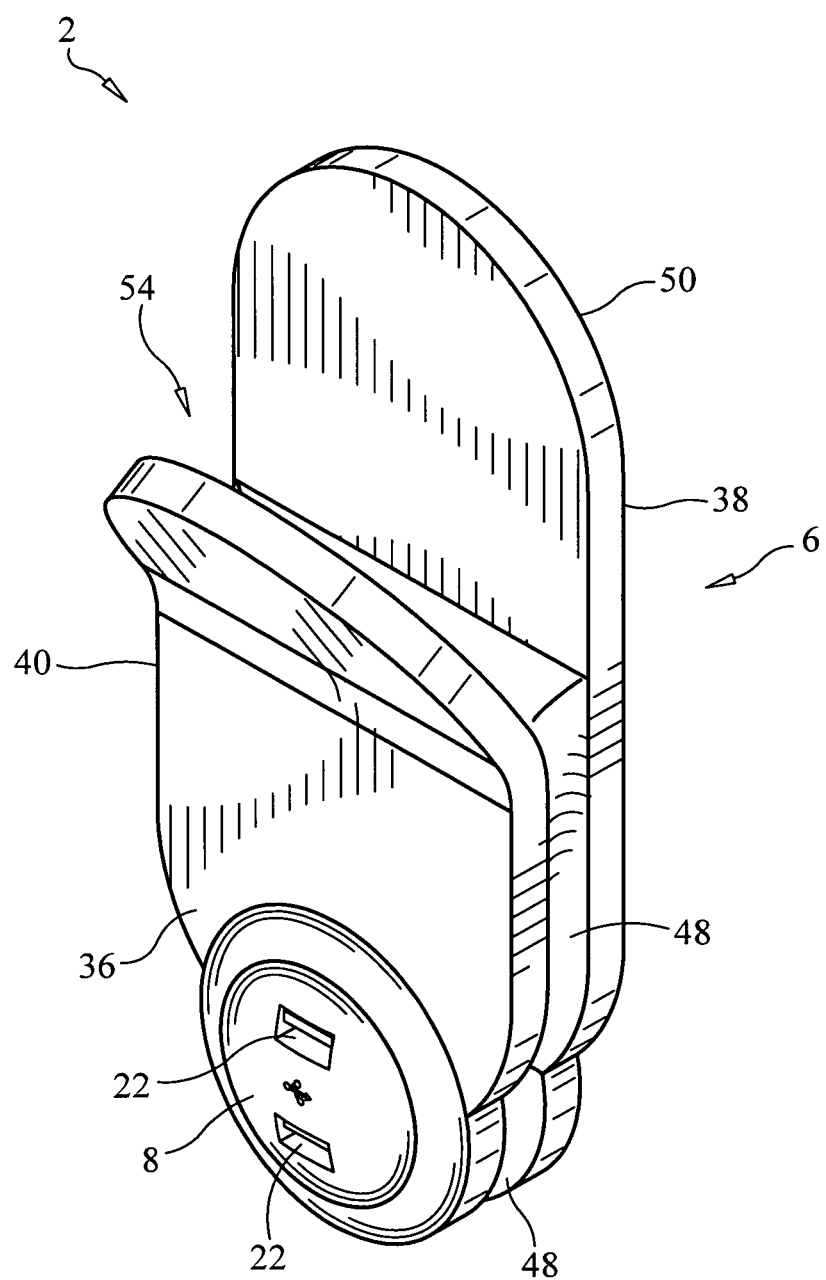
FIG. 1 is a front perspective view of a charge clip formed in accordance with the present invention.
Figure 7:
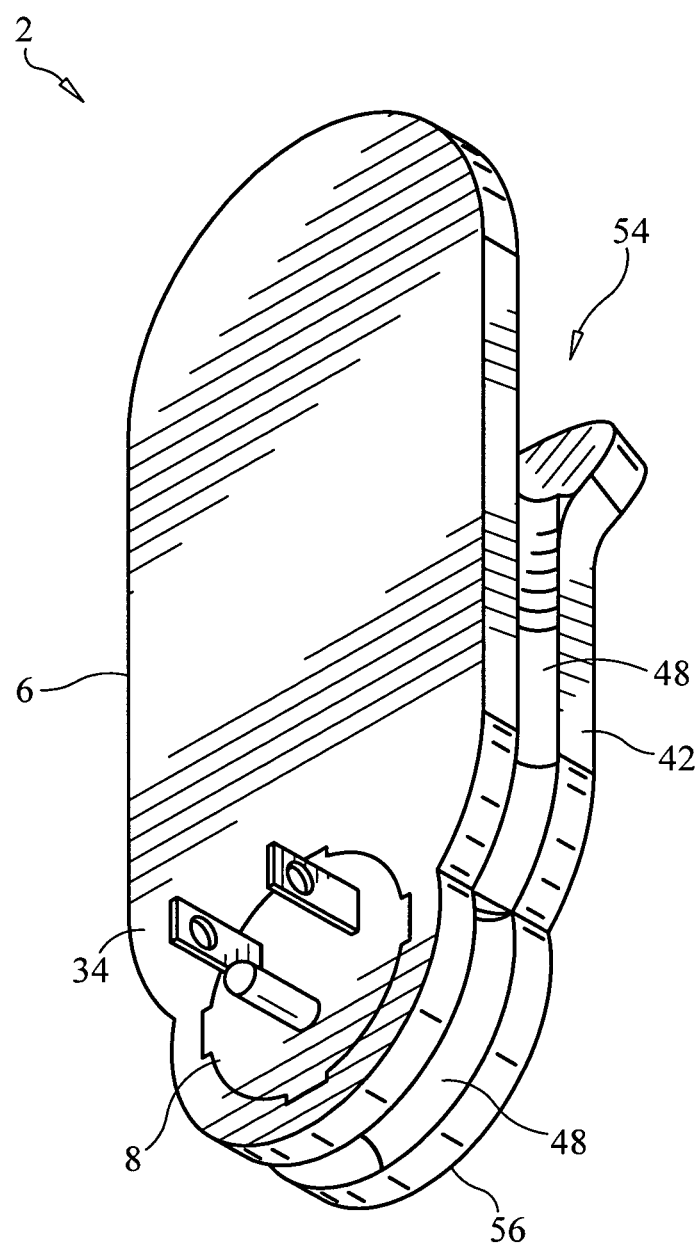
FIG. 7 is a rear perspective view of the charge clip of the present invention shown in FIGS. 1-6.

As can be seen from FIGS. 1-11, a charge clip 2 or station for charging a small appliance or electrical device, in particular but not limited to personal electronic instruments 4 such as cellular telephones, hand held gaming devices, digital cameras, PDAs, calculators and the like, and constructed in accordance with one form of the present invention, is preferably formed from two mateable portions, that is, a main body 6 and a power conversion plug 8.

The power conversion plug 8 is preferably cylindrical in shape. The power conversion plug 8 includes a circumferential side wall 10, a front wall 12 which is preferably for aesthetic purposes convexly shaped, and a rear wall 14 which is opposite the front wall 12.

The rear wall 14 of the power conversion plug 8 includes hot and neutral AC power prongs 16 and an AC power ground prong 18 extending outwardly therefrom so that the power conversion plug 8 may be connected directly to a socket of an AC wall outlet 20.

At least one, but preferably two, or more, USB ports or connectors 22 are situated on the front wall 12 of the power conversion plug 8. As is well known, oftentimes personal electronic instruments 4 are charged by connection to a USB port provided on a computer or other device, where +5 volts DC (direct current) is provided on a certain pin of the USB port or connector. Accordingly, and as will be described in greater detail, the charge clip 2 of the present invention provides such a DC charging voltage to a selected pin on each of the USB ports or connectors 22 mounted on the power conversion plug 8, as well as providing a ground connection to another pin on each of the USB ports or connectors 22.

Figure 14:
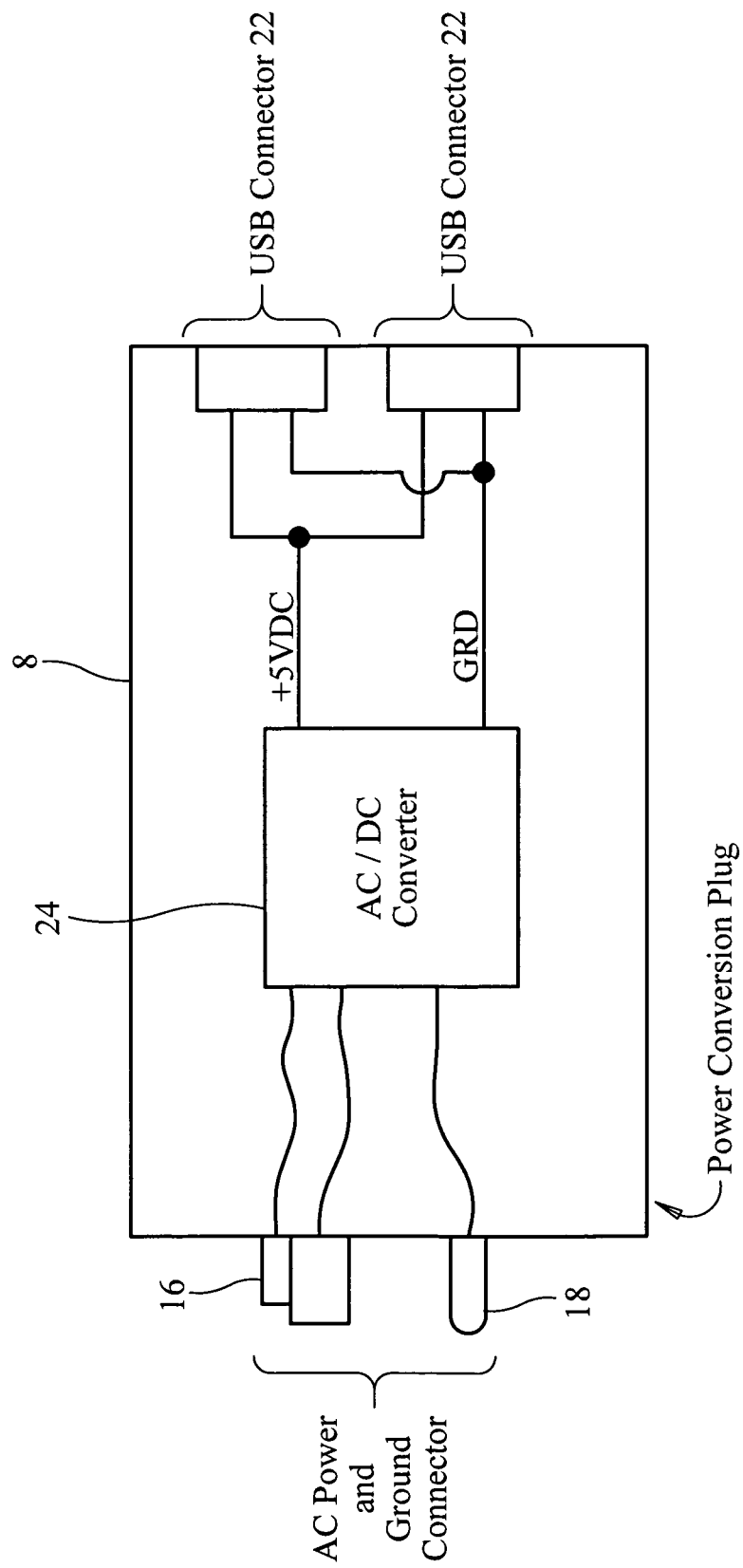
FIG. 14 is a simplified schematic/block diagram of the electrical circuit of the charge clip of the present invention.

A simplified schematic/block diagram of a circuit housed by the power conversion plug 8 and situated in an interior cavity defined by the cylindrical side wall 10, front wall 12 and rear wall 14 thereof is shown in FIG. 14. Basically, the power and ground prongs 16, 18 of the power conversion plug 8 are electrically connected to an AC-to-DC (AC/DC) converter circuit 24 situated within the power conversion plug 8. The AC/DC converter circuit 24 receives the 110 volt AC (alternating current) power provided by the wall outlet 20 to which the charge clip 2 is connected, and converts the AC voltage to a DC voltage, and in particular, a +5 volt DC voltage. The +5 volt DC voltage is provided to each of the USB connectors or ports 22 mounted on the front wall 12 of the power conversion plug 8 through electrical lines connected between the AC/DC converter circuit 24 and the USB connectors or ports 22 and, similarly, ground potential is provided by electrical lines connected between the AC/DC converter circuit 24 and the USB connectors or ports 22. In this way, a user may connect one or more PEIs 4 to the USB connectors or ports 22 situated on the power conversion plug 8 with a power charging cord 26 which is compatible with the USB connectors or ports 22 and the PEIs 4 being charged.

Figure 9:
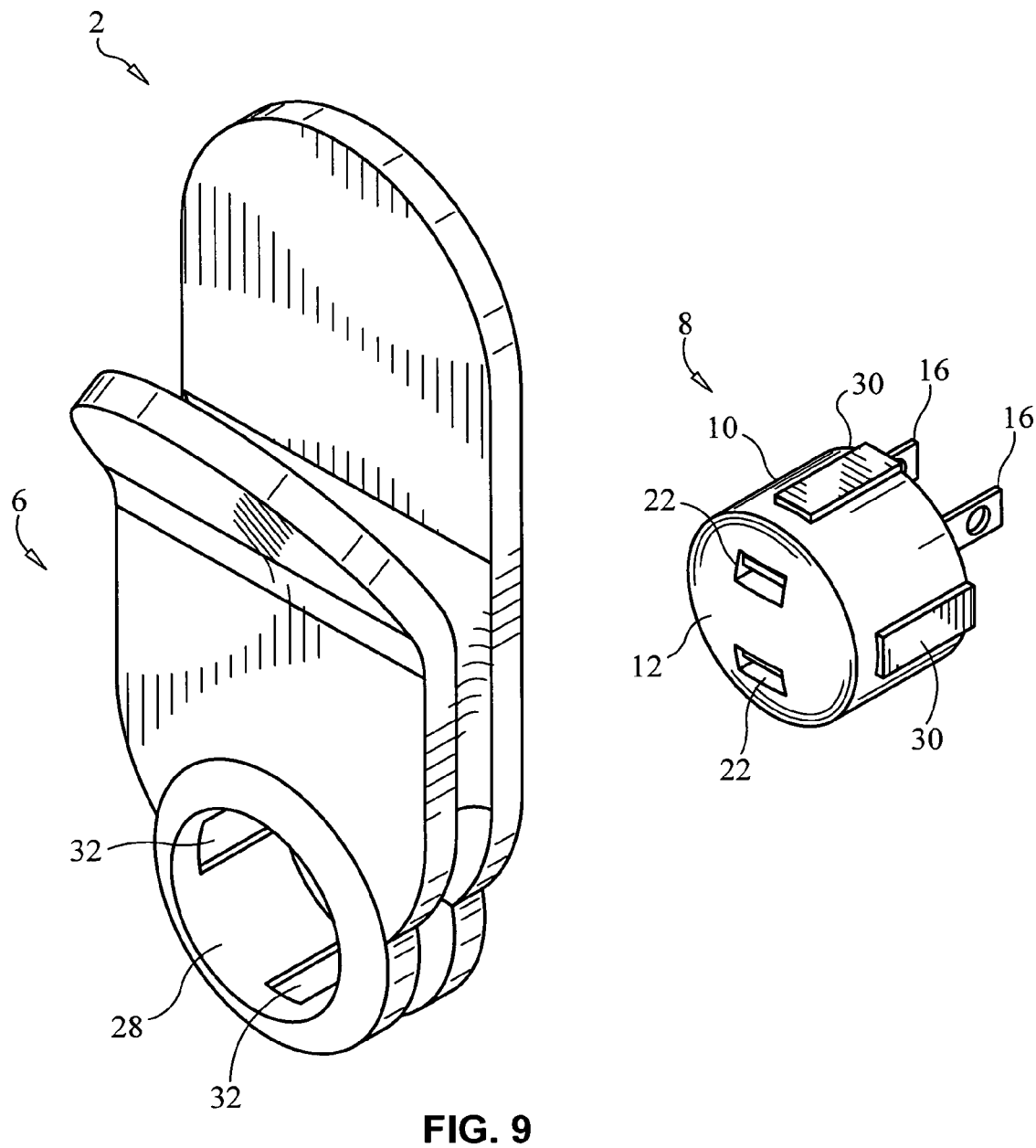
FIG. 9 is a front perspective exploded view of the charge clip of the present invention shown in FIGS. 1-8.
Figure 12D:
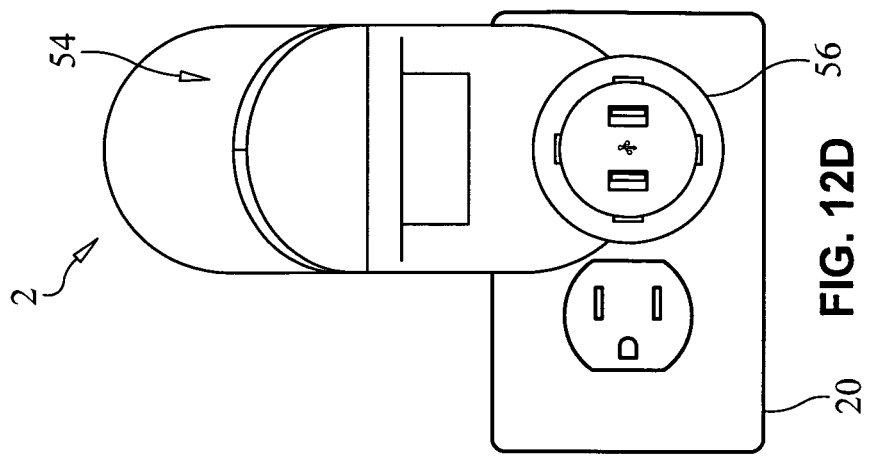
FIGS. 12A-12D are front plan views of the charge clip of the present invention mounted to an AC wall outlet, where the AC wall outlet is shown in four different orientations.
Figure 12C:
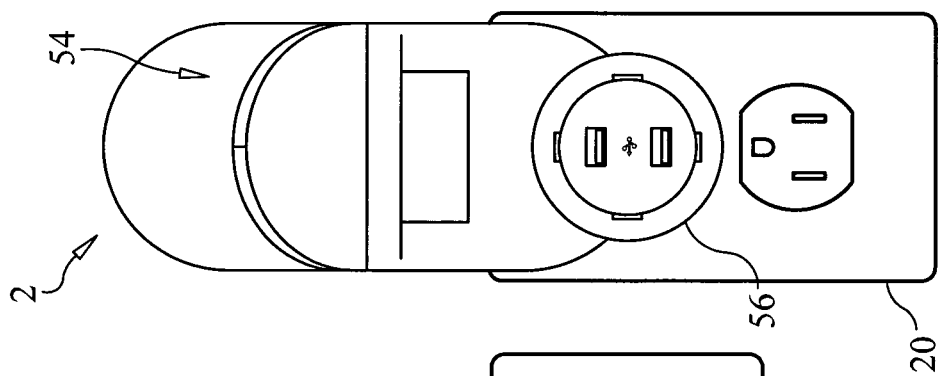
Figure 12B:
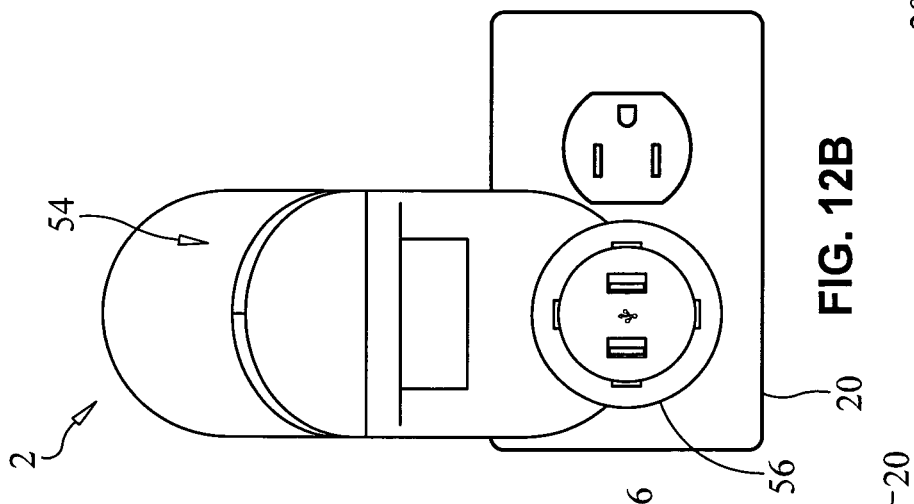
Figure 12A:
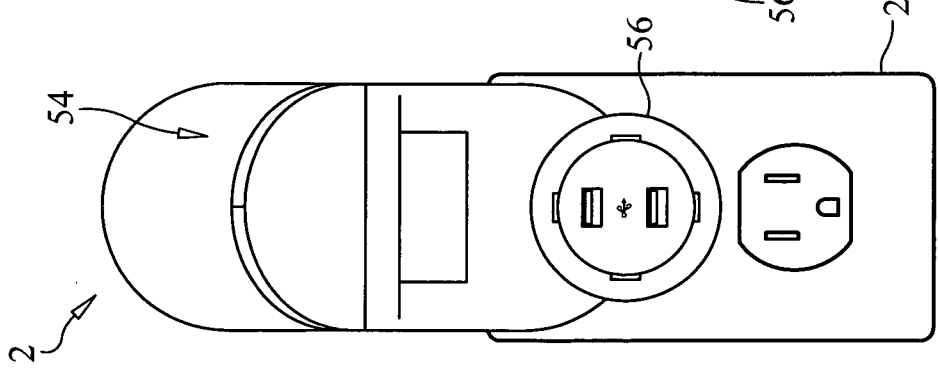
Figure 13:
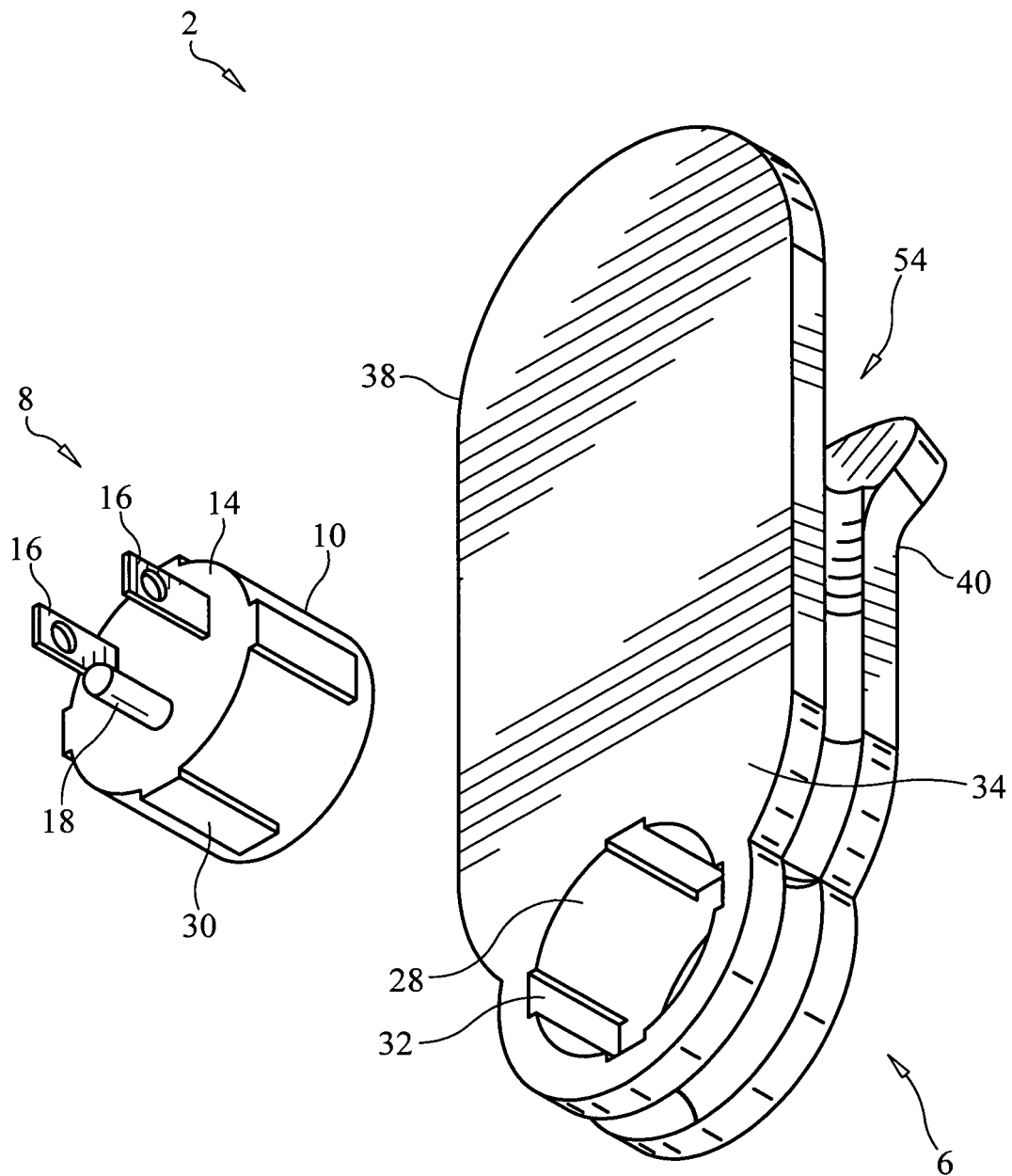
FIG. 13 is a rear perspective exploded view of the charge clip of the present invention shown in FIGS. 1-12.

The power conversion plug 8 is received by an aperture 28 formed through the thickness of the main body 6 of the charge clip 2, as can be seen from FIGS. 9 and 13. As can also be seen, the power conversion plug 8 may be removed from the aperture 28 and repositioned therein in one of several different orientations.

More specifically, the power conversion plug 8 includes preferably four ribs 30 extending outwardly from the outer surface of the side wall 10, with adjacent ribs 30 being spaced apart about the circumference thereof by 90 degrees. The ribs 30 extend at least partially over the outer surface of the side wall 10 of the power conversion plug 8 in an axial direction between the front wall 12 and the rear wall 14 thereof.

Corresponding notches 32, each of which is dimensioned to closely receive a respective rib 30 on the power conversion plug 8, are formed in the rear surface 34 of the main body 6 of the charge clip 2 and which extend at least partially through the thickness thereof toward the front surface 36 of the main body 6 of the charge clip. Preferably, the notches 32 do not extend all the way through the thickness so that they are not visible on the front surface 36 of the main body 6, which provides a more aesthetically pleasing appearance to the charge clip 2 and so that a user may push on the main body 6 of the charge clip to force the power and ground prongs 16, 18 into a wall outlet 20 without the power conversion plug 8 moving axially within the plug receiving aperture 28 of the main body 6. As can be seen from the figures, the ribs 30 extend from the rear wall 14 of the power conversion plug 8 towards the front wall 12, but, preferably, are recessed from the front wall 12. In this manner, the power conversion plug 8 may be inserted into the aperture 28 of the charge clip 2 from the rear surface 34 thereof, and may be removed therefrom by pulling outwardly on the plug 8 from the rear surface 34 of the main body 6 of the charge clip 2. The power conversion plug 8 may be orientated in one of four positions within the aperture 28 of the main body 6 of the charge clip and, as will be explained in greater detail, this feature which allows the power conversion plug 8 to be reoriented with respect to the main body 6 of the charge clip permits the charge clip 2 to be used with AC wall outlets 20 which may have been installed in four different orientations (see FIGS. 12A-12D).

As can be seen from FIGS. 1-13, the main body 6 of the charge clip 2 is an elongated member, preferably slightly longer than a conventional wall outlet cover plate. It includes a planar back plate 38 and a front plate 40 situated in front of the back plate 38, the front and back plates 40, 38 being joined together to define lateral side walls 42, a top wall 44 and a bottom wall 46 of the main body 6.

A groove or channel 48 is formed in the adjoining lateral side walls 42, top wall 44 and bottom wall 46 of the main body 6 where the front and back plates 40, 38 are joined together. The groove 48 is provided for cord management, that is, so that excess length of the charging cord 26 connected between the USB ports or connectors 22 on the power conversion plug 8 and the PEIs 4 being charged may be conveniently wrapped about the main body 6 in the groove 48 between the front 40 plate and the back plate 38.

Figure 8:
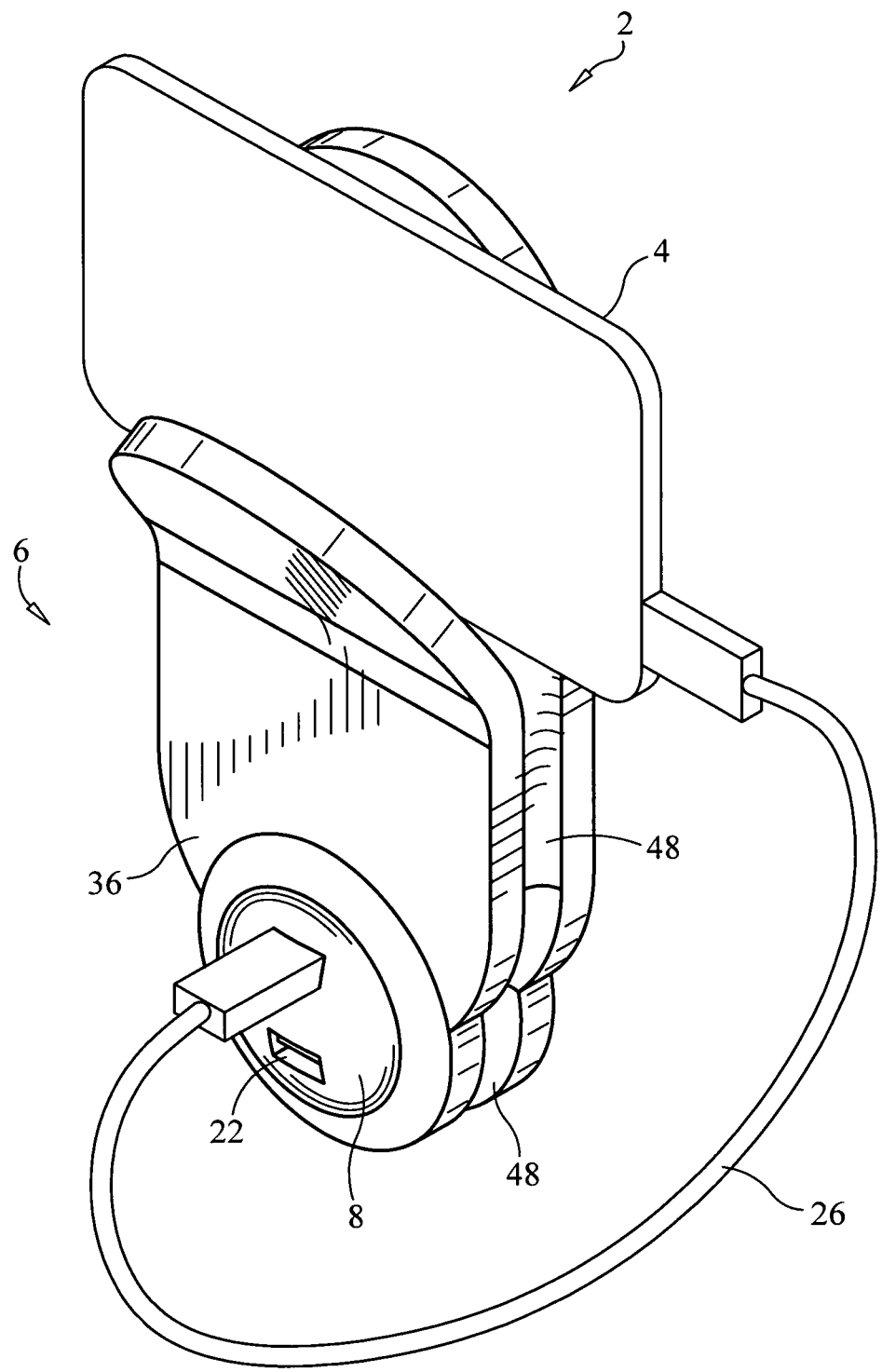
FIG. 8 is a front perspective view of the charge clip of the present invention, shown supporting a personal electronic instrument (PEI) and illustrating the connection between the PEI and the charge clip using a charge cord for charging the PEI.

The upper portion or segment 50 of the back plate 38 extends upwardly, while the upper portion or segment 52 of the front plate 40 diverges from the plane in which the back plate 38 resides at an acute angle therefrom in a direction outwardly of the front of the main body 6. The widths of the front plate 40 and the back plate 38 are preferably substantially the same, and so are the thicknesses. Thus, the upper portion 50 of the back plate 38 and the upper portion 52 of the front plate 40, where the two diverge, define a cradle 54 which may receive and support one or more PEIs 4, as shown in FIGS. 8 and 11. As shown in these drawings, the PEIs 4 are supported by the main body 6 of the charge clip 2 in the cradle 54 when the charge clip 2 is in an upright (vertical) position. The cradle 54 has a depth and width which are selected to receive one or more of the electrical devices 4 (e.g., cellular telephones, hand held gaming devices, PDAs, shavers or the like) and holds such electrical devices in a safe and convenient location on the charge clip 2, as shown in the drawings. In this way, the electrical devices 4 do not have to occupy space on the countertop or other horizontal surface when being charged and are not subjected to damage from liquid spillage and the like. Furthermore, the charge clip 2 of the present invention is adapted to hold the portable electrical device 4 during charging, as well as providing a location for maintaining the device 4 when the device is not being used so that the device can be easily found. Furthermore, the charge clip 2 of the present invention, with its top cradle 54, keeps the device 4 clean and out of harm's way while the device is being charged. Preferably, the angled upper segment 52 of the front plate 40 does not extend vertically as high as the upper segment 50 of the back plate 38, as can be seen in FIG. 4, so that any electrical device 4 held in the cradle 54 may be easily placed there or retrieved by a user from the front of the charge clip 2.

It is been found that AC wall outlets 20 may be disposed in one of four orientations, such as shown in FIGS. 12A-12D. For example, a two socket AC wall outlet 20 may be disposed with the ground contacts of the each socket in a bottom position (see FIG. 12A), in a right position (see FIG. 12B), in a top position (see FIG. 12C) and in a left position (see FIG. 12D). The charge clip 2 of the present invention is reconfigurable by removing the power conversion plug 8 from the aperture 28 formed in the main body 6 of the charge clip, rotating the plug 8 and reinserting the plug 8 into the aperture 28 in a different orientation, with the ribs 30 being received by corresponding notches 32 formed in the main body 6, so that the power prongs 16 and ground prong 18 on the power conversion plug 8 may be properly received by a socket of the wall outlet 20 and with the main body 6 of the charge clip 2 being oriented longitudinally in a vertical or upright position when the charge clip is plugged into a socket of the wall outlet 20. Thus, the charge clip 2 of the present invention ensures that the cradle 54 is always in an upright position when the charge clip 2 is mounted on a wall outlet 20 to hold one or more PEIs 4 or other electrical devices in the cradle 54.

Furthermore, it should be realized that the lower portion 56 of the charge clip 2 is preferably circular and has a diameter which is less than the width of the major portions of the front and back plates 40, 38 of the main body 6. This is to ensure that the charge clip 2, when mounted on an AC wall outlet 20, only occupies one electrical socket thereof and does not overlap an adjacent electrical socket of the wall outlet 20 or interfere with the use thereof independently of the charge clip 2, as can be seen from FIGS. 12A-12D.

It should be further noted that the design of the cradle 54 formed in the upper portion of the charge clip 2 and, in particular, the main body 6 thereof, allows one or more PEIs 4 to be accessed from a number of directions, including the front of the charge clip, the left and right side of the charge clip and from the top (in an upward direction) of the charge clip.

It should be further realized that, although the power conversion plug 8 is described herein as being preferably cylindrical in form, with ribs 30 extending from the outer surface of the cylindrical side wall 10 thereof, and the aperture 28 formed in the main body 6 of the charge clip is described as being circular, it should be understood that the power conversion plug 8 may be formed in other geometrical shapes, including rectangular, square or polygonal, with a conformingly shaped aperture 28 formed in the main body 6 of the charge clip 2 to receive the power conversion plug 8, whereby the power conversion plug 8 may be removed from the main body 6 of the charge clip 2, reoriented and repositioned therein so that the main body 6 of the charge clip is always oriented in an upright position, with the cradle 54 formed therein situated at the top of the charge clip 2 to support, without falling, one or more electrical devices 4 therein.

Additionally, it is envisioned to be within the scope of the present invention to form the power conversion plug 8 in a cylindrical shape, and the aperture 28 formed in the main body 6 of the charge clip in a round shape, without ribs 30 or notches 32 being formed on and in the power conversion plug 8 and main body 6, respectively, so that the power conversion plug 8 is receivable by the aperture 28 with a frictional fit, and the main body 6 of the charge clip 2 is frictionally rotatable on the power conversion plug 8 to orient the main body 6 of the charge clip 2 in a vertically upright position thereon. Furthermore, although the notches 32 have been described as being formed on the main body 6 about the aperture 28, and the ribs 30 have been described as being formed on the power conversion plug 8, it should be understood that the positions of the ribs 30 and the notches 32 may be reversed, with the ribs 30 being formed on the main body 6 to partially extend into the aperture 28, and the notches 32 being formed in the cylindrical side wall 10 of the power conversion plug 8.

As mentioned previously, the width of the main body 6 is preferably about that of a small sized (two socket) cover plate forming part of the AC wall outlet 20, and the main body 6 of the charge clip 2 is preferably slightly taller than the small wall cover plate.

The charge clip 2 of the present invention is a two piece solution with all of the electronics for the conversion to a USB DC voltage in the power conversion plug 8 which plugs directly into an electrical socket of the wall outlet 20. The main body 6 of the charge clip 2 is provided to hold electrical devices 4 and is preferably formed from a plastic material, with no electronic circuitry formed therein or thereon, and it can be attached to the power conversion plug 8 in one of four orientations, ensuring that the cradle 54 for holding electronic devices 4 is always situated at the top no matter how the wall outlets 20 (and the power conversion plug 8) are oriented. This two piece solution solves the issues relating to having wall outlets 20 disposed in various orientations to allow the user to have a device situated in the cradle 54 and held thereby, which cradle 54 will always be in a vertical position and at the top of the charge clip 2 no matter how an electrician installed the AC wall outlets 20. Furthermore, the groove or channel 48 formed about the side walls 42, top wall 44 and bottom wall 46 of the charge clip 2 provides cord management and allows the user to wrap thereabout excess charging cord 26 between the USB port or connector 22 on the power conversion plug 8 and the PEI 4.

Preferably, the cradle 54 may have situated therein a rubberized "taco shell" strip of material (not shown) to help secure the electronic devices therein. Additionally, it should be realized that the power conversion plug 8 may be removed from the main body 6 of the charge clip and used separately, without the main body 6, to provide power to an electrical device 4.

Furthermore, it is envisioned to be within the scope of the present invention to provide an AC power outlet (not shown) on the front wall 12 of the power conversion plug 8 in lieu of, or in addition to, the USB connectors 22 so that, if the electrical device 4 to be charged has its own transformer forming part of the charging cord 26, the transformer may be plugged into the AC power outlet on the plug 8 to charge the electrical device 4 rather than using the USB connector 22.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A charge clip for charging and supporting an electrical device thereon, the charge clip being pluggable into an AC wall outlet having power slots, which comprises:
    a main body, the main body having an upper portion defining a cradle for at least partially receiving and supporting therein the electrical device, the main body having a continuous internal wall completely encircled within the main body and further having formed therein an aperture defined by the completely encircled internal wall; and
    a power plug, the power plug including an outer housing having a rear surface and a front surface situated opposite the rear surface, and a continuous side wall extending between the rear surface and the front surface, the power plug having AC power prongs extending from the rear surface thereof which are receivable by corresponding power slots of the AC wall outlet so that the charge clip is mountable to the AC wall outlet in a desired orientation, the power plug further having a power outlet situated on the front surface thereof on which power is provided for providing the power to the electrical device, the aperture formed in the main body being dimensioned and shaped to fully receive the outer housing of the power plug such that the continuous internal wall of the main body fully encircles and faces the continuous side wall of the outer housing of the power plug, the outer housing of the power plug being fully receivable by the aperture of the main body and being repositionable with respect to the main body between at least a first orientation and a second orientation, the power plug being removable from and reinsertable in the aperture of the main body in order to reposition the power plug with respect to the main body between the at least first orientation and the second orientation;
    wherein at least one of the internal wall of the main body defining the aperture and the side wall of the outer housing of the power plug includes four ribs extending outwardly therefrom, adjacent ribs being spaced apart from one another by ninety degrees, and wherein at least the other of the internal wall of the main body defining the aperture and the side wall of the outer housing of the power plug includes four notches formed therein, adjacent notches being spaced apart from one another by ninety degrees, the ribs being receivable by corresponding notches to selectively maintain the position of the power plug with respect to the main body in at least one of the at least first orientation and the second orientation and to prevent the rotation of the power plug within the aperture of the main body in a clockwise direction and a counterclockwise direction.

2. A charge clip as defined by claim 1, wherein the power plug has formed therein an internal cavity, and wherein the charge clip further comprises a power conversion circuit, the power conversion circuit being disposed within the internal cavity of the power plug and being in electrical communication with the AC power prongs and the power outlet respectively situated on the rear surface and front surface of the power plug.

3. A charge clip as defined by claim 2, wherein the power outlet situated on the front surface of the power plug includes at least one USB port.

4. A charge clip as defined by claim 2, wherein the power conversion circuit includes an AC-to-DC converter circuit.

5. A charge clip as defined by claim 1, wherein the main body includes a back portion and a front portion situated adjacent to the back portion, each of the front portion and the back portion having an upper segment, the upper segment of the front portion diverging from the upper segment of the back portion to define the electrical device supporting cradle between the upper segment of the front portion and the upper segment of the back portion.

6. A charge clip as defined by claim 5, wherein the upper segment of the front portion diverges from the upper segment of the back portion at an acute angle measured between the upper segments of the front portion and the back portion.

7. A charge clip as defined by claim 5, wherein the height of the upper segment of the front portion is less than the height of the upper segment of the back portion to facilitate the placement of an electrical device in the cradle and the removal of the electrical device from the cradle.

8. A charge clip as defined by claim 5, wherein the main body includes opposite lateral side walls, each lateral side wall having a groove formed therein for receiving a portion of an electrical cable used for charging an electrical device.

* * * * *